(12) United States Patent
Lu et al.

(10) Patent No.: US 9,012,590 B2
(45) Date of Patent: Apr. 21, 2015

(54) ELECTROSTATIC DISSIPATIVE TPU AND COMPOSITIONS THEREOF

(75) Inventors: Qiwei Lu, Seven Hills, OH (US); Donald A. Meltzer, Akron, OH (US); Yona Eckstein, Coconut Creek, FL (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 75 days.

(21) Appl. No.: 12/895,996

(22) Filed: Oct. 1, 2010

(65) Prior Publication Data

US 2011/0092648 A1  Apr. 21, 2011

Related U.S. Application Data

(60) Provisional application No. 61/251,782, filed on Oct. 15, 2009.

(51) Int. Cl.
| | |
|---|---|
| *C08G 18/00* | (2006.01) |
| *C08G 18/42* | (2006.01) |
| *C08G 18/32* | (2006.01) |
| *C08G 18/66* | (2006.01) |
| *C08G 18/76* | (2006.01) |
| *C08K 5/00* | (2006.01) |
| *C08K 5/41* | (2006.01) |

(52) U.S. Cl.
CPC ........ *C08G 18/4202* (2013.01); *C08G 18/3215* (2013.01); *C08G 18/4238* (2013.01); *C08G 18/664* (2013.01); *C08G 18/7671* (2013.01); *C08K 5/0075* (2013.01); *C08K 5/41* (2013.01)

(58) Field of Classification Search
USPC .......... 525/440.01, 440.12, 440.13, 452, 453, 525/454, 455; 528/76, 80, 83, 84, 85
See application file for complete search history.

(56) References Cited

U.S. PATENT DOCUMENTS

| | | | |
|---|---|---|---|
| 4,798,851 A | 1/1989 | Werner et al. | |
| 5,159,053 A * | 10/1992 | Kolycheck et al. | 528/76 |
| 5,346,788 A * | 9/1994 | Chang et al. | 429/249 |
| 5,574,104 A | 11/1996 | Kolycheck et al. | |
| 6,140,405 A * | 10/2000 | Eckstein et al. | 524/419 |
| 2006/0058455 A1 | 3/2006 | Michels et al. | |
| 2009/0300946 A1 | 12/2009 | Egbers et al. | |
| 2012/0021198 A1 * | 1/2012 | Lee et al. | 428/215 |

FOREIGN PATENT DOCUMENTS

| | | | | |
|---|---|---|---|---|
| WO | 2007/090755 A1 | 8/2007 | | |
| WO | WO 2009086246 A1 * | 7/2009 | | C08G 18/08 |

* cited by examiner

*Primary Examiner* — Michael L Leonard
(74) *Attorney, Agent, or Firm* — Eryn A. Fuhrer, Esq.; Teresan W. Gilbert, Esq.

(57) ABSTRACT

The present invention relates to an electrostatic dissipative thermoplastic polyurethane composition made by reacting (a) at least one polyester polyol intermediate with (b) at least one diisocyanate and (c) at least one chain extender. The polyester polyol intermediate, may be derived from at least one dialkylene glycol and at least one dicarboxylic acid, or an ester or anhydride thereof. The invention further provides for methods of making said thermoplastic polyurethane composition, polymer blends containing said thermoplastic and polymer articles made from said thermoplastic.

12 Claims, No Drawings

ELECTROSTATIC DISSIPATIVE TPU AND COMPOSITIONS THEREOF

CROSS REFERENCE

This application claims priority from Provisional Application Ser. No. 61/251,782 filed on Oct. 15, 2009.

BACKGROUND OF THE INVENTION

The present invention relates to electrostatic dissipative thermoplastic urethanes (TPU) and compositions thereof.

The formation and retention of charges of static electricity on the surface of most plastics is well known. Many plastic materials have a significant tendency to accumulate static electrical charges due to low electrical conductivity. This type of formation and retention of charges of static electricity can be problematic. The presence of static electrical charges on sheets of thermoplastic film, for example, can cause the sheets to adhere to one another thus making their separation for further processing more difficult. Moreover, the presence of static electrical charges causes dust to adhere to items packaged in a plastic bag for example, which may negate any sales appeal.

The increasing complexity and sensitivity of microelectronic devices makes the control of static discharge of particular concern to the electronics industry. Even a low voltage discharge can cause severe damage to sensitive devices. The need to control static charge buildup and dissipation often requires the entire assembly environment for these devices to be constructed of partially conductive materials and/or electrostatic discharge (ESD) materials. It also may require that electrostatic protective packages, tote boxes, casings, and covers be made from conductive polymeric materials to store, ship, protect, or support electrical devices and equipment.

The prevention of the buildup of static electrical charges which accumulate on plastics during manufacture or use has been accomplished by the use of various ESD additives such as antistatic agents and ESD ingredients. These additives can be applied as a coating which may be sprayed or dip coated on the article after manufacture, although this method usually results in a temporary solution. Alternatively, these materials can be incorporated into a polymer used to make the article during processing, thereby providing a greater measure of permanence.

However, the incorporation of such ESD materials (ESD and/or antistatic agents) presents serious problems. For example, the high temperatures required for conventional processing of most polymers will often damage or destroy antistatic agents. Moreover, many ESD agents are not miscible with the matrix or base polymers in which they are used. These issues can lead to reduced moldability of the polymer, or blends containing the polymer, as the antistatic agents can migrate or diffuse to the surface during processing and deposit a coating on mold surfaces, possibly destroying the surface finish on the manufactured part being molded. In severe cases, the surface of the article becomes oily and marbleized. A large number of antistatic agents are also either cationic or anionic in nature. These agents tend to cause the degradation of plastics, particularly PVC, and result in discoloration or loss of physical properties. Additional problems which can occur with ESD agents include loss of their ESD capability due to evaporation, wear and rinsing, the development of undesirable odors, and the promotion of stress cracking or crazing on the surface of an article in contact with the article of manufacture. ESD agents may also be very sensitive to moisture, leading to reduced effectiveness in applications that expose the agent to water.

There are several examples of high molecular weight ESD agents in the prior art. In general, these additives have been high molecular weight polymers of ethylene oxide or similar materials like propylene oxide, epichlorohydrin, glycidyl ethers, and the like. It has been a requirement that these additives be high molecular weight materials to overcome the problems related to the migration, evaporation and/or the thermal stability of the ESD additive. However, these prior art ESD additives do not have a desired balance between electrical conductivity and acceptable low levels of extractable anions, in particular chloride, nitrate, phosphate, and sulfate, which in turn can cause any manufactured articles containing such ESD additives to have unacceptable properties for some end uses.

In addition, there are examples in the art of certain polyether thermoplastic urethanes that have good ESD properties, with and without the use of antistatic agents. However, polyether TPU compositions generally have poor properties including poor phase separation characteristics, difficulties achieving high molecular weights, inadequate compatibility with many other types of host polymers resulting in poor physical properties, and poor heat performance making them unsuitable for many applications. Polyester TPU compositions generally have better physical properties, but poor ESD properties. There is a need for TPU compositions that possess both the ESD properties of polyether TPU compositions and the physical properties of polyester TPU compositions.

SUMMARY OF THE INVENTION

The present invention provides an electrostatic dissipative thermoplastic polyurethane (ESD-TPU) composition made by reacting (a) at least one polyester polyol intermediate with (b) at least one diisocyanate and (c) at least one chain extender. The polyester polyol intermediate may be derived from at least one dialkylene glycol and at least one dicarboxylic acid, or an ester or anhydride thereof. The present invention also provides a process of making such ESD-TPU polymers and compositions thereof.

The compositions of the present invention may further comprise an effective amount of a metal containing salt for acceptable electrostatic dissipation properties.

The compositions of the present invention may be a polymer blend comprising the ESD-TPU compositions described herein mixed with at least one polymer base.

The present invention also provides shaped polymeric articles where the articles comprise the ESD-TPU compositions described herein.

DETAILED DESCRIPTION OF THE INVENTION

Various features and embodiments of the invention will be described below by way of non-limiting illustration.

The Electrostatic Dissipative Thermoplastic Polyurethane.

The electrostatic dissipative thermoplastic polyurethane (ESD-TPU) polymers used in this invention are made by reaction of three reactants. The first reactant is a polyester polyol intermediate, the second reactant is a diisocyanate, and the third reactant is a chain extender. Each of the three reactants is discussed below.

The ESD-TPU polymer and/or compositions thereof of the present invention have dramatically improved ESD properties compared to conventional polyester polyol-derived TPU polymers, and may also have improved physical properties and/or improved ionic cleanliness properties compared to conventional polyether polyol-derived TPU polymers. In one embodiment, the ESD-TPU polymer and/or compositions thereof of the present invention have ESD properties at least comparable to conventional polyether polyol-derived TPU polymers and/or compositions thereof while also having physical properties and/or ionic cleanliness properties at least comparable to conventional polyester polyol-derived TPU polymers and/or compositions thereof In some embodiments, the ESD-TPU polymer compositions of the present invention have a surface resistivity of no more than, or below, $1.0 \times 10^{13}$ ohm/square, and/or a volume resistivity of no more than, or below, $1.0 \times 10^{12}$ ohm-centimeter, as measured by ASTM D-257. In other embodiments, the ESD-TPU polymer compositions have a surface resistivity of no more than, or below, $1.0 \times 10^{11}$ ohm/square, and/or a volume resistivity of no more than, or below, $1.0 \times 10^{11}$ ohm-centimeter.

The ESD-TPU polymer compositions may also have a static decay rate of less than about 1 second, or about 0.1 seconds from 1000 V to 100 V as measured at 50% relative humidity using a charged plate monitor, and/or a static decay rate of less than about 1 second, or about 0.1 seconds from 5000 V to 50 V or from −5000 V to −50 V, as measured at 12% relative humidity, by FTMS 101C.

The ESD-TPU polymer compositions may also possess one or more of the physical properties described below, including embodiments in combination with one or more of the ESD properties described above. The composition may have a hardness of at least 60 or 70 Shore A units, as measured by ASTM D-2240. The composition may have a tensile strength of at least 10, 15, 17 or even 17.9 MPa and an ultimate elongation of more than 300%, 500% or even 600% as measured by ASTM D-412. The composition may have a Graves tear value of at least 5, or 5.6 kg/mm, as measured by ASTM D-624, using die C. The composition may have a Taber loss, per CS-17/1000 revolutions, of not more than, or less than, 100, 50, 40, or even 35 mg, as measured by ASTM D-3389 or D4060-95. The composition may have a weight average molecular weight of from 60,000 to 500,000 or from 80,000 to 300,000. The composition may have a melt flow index of less than 50, 40 or even 35 grams per 10 minutes, as measured by ASTM D-1238 Procedure A at a barrel temperature of 190° C. and a 3.8 kg piston load.

In some embodiments, the present invention also solves the problem of obtaining ESD polymers without also having unacceptably high levels of extractable anions, in particular chloride, nitrate, phosphate, fluoride, bromide, and sulfate anions and ammonium cations. In such embodiments, the ESD TPU polymer and/or compositions thereof have less than about 8,000 parts per billion (ppb) total extractable anions measured from the group of all six of chloride anions, nitrate anions, phosphate anions, fluoride anions, bromide anions, and sulfate anions, and less than about 1,000 ppb of said chloride anions, less than about 100 ppb of said nitrate anions, less than about 6,000 ppb of said phosphate anions, and less than about 1,000 ppb of said sulfate anions.

The Polyester Polyol Intermediate.

The polyester polyol intermediate of the present invention is derived from at least one dialkylene glycol and at least one dicarboxylic acid, or an ester or anhydride thereof.

The polyester polyol intermediates of the present invention may include at least one terminal hydroxyl group, and in some embodiments, at least one terminal hydroxyl group and one or more carboxylic acid groups. In another embodiment, the polyester polyol intermediates include two terminal hydroxyl groups, and in some embodiments, two hydroxyl groups and one or more, or two, carboxylic acid groups. The polyester polyol intermediates are generally a substantially linear, or linear, polyester having a number average molecular weight (Mn) of from about 500 to about 10,000, about 500 to about 5000, or from about 1000 to about 3000, or about 2000.

In some embodiments, the polyester polyol intermediate may have a low acid number, such as less than 1.5, less than 1.0, or even less than 0.8. A low acid number for the polyester polyol intermediate may generally provide improved hydrolytic stability in the resulting TPU polymer. The acid number may be determined by ASTM D-4662 and is defined as the quantity of base, expressed in milligrams of potassium hydroxide that is required to titrate acidic constituents in 1.0 gram of sample. Hydrolytic stability can also be improved by adding hydrolytic stabilizers to the TPU which are known to those skilled in the art of formulating TPU polymers.

Dialkylene glycols suitable for use in preparing the polyester polyol intermediate of the present invention may be aliphatic, cyclo-aliphatic, aromatic, or combinations thereof. Suitable glycols may contain from 2 or 4 or 6 to 20, 14, 8, 6 or 4 carbon atoms, and in some embodiments may contain 2 to 12, 2 to 8 or 6, 4 to 6, or even 4 carbon atoms. In some embodiments, the dialkylene glycol includes oxydimethanol, diethylene glycol, dipropylene glycol, 3,3-oxydipropan-1-ol, dibutylene glycol, or combinations thereof. In other embodiments, one or more of the dialkylene glycols listed may be excluded from the present invention. Blends of two or more glycols may be used. In some embodiments, monoalkylene glycols may be used in combination with the dialkylene glycols described above. In other embodiments, the glycol used to prepare the polyester polyol intermediate is free of monoalkylene glycols.

Dicarboxylic acids suitable for use in preparing the polyester polyol intermediate of the present invention may be aliphatic, cyclo-aliphatic, aromatic, or combinations thereof. Suitable acids may contain from 2, 4, or 6 to 20, 15, 8, or 6 carbon atoms, and in some embodiments may contain 2 to 15, 4 to 15, 4 to 8, or even 6 carbon atoms. In some embodiments, the dicarboxylic acids include succinic acid, glutaric acid, adipic acid, pimelic acid, suberic acid, azelaic acid, sebacic acid, dodecanedioic acid, isophthalic acid, terephthalic acid, cyclohexane dicarboxylic acid, or combinations thereof. In other embodiments, one or more of the dicarboxylic acids listed may be excluded from the present invention.

The polyester polyol intermediates of the present invention may also be derived from an ester or anhydride of one or more the dicarboxylic acids described above or combinations of such materials. Suitable anhydrides include succinic anhydride, alkyl and/or alkenyl succinic anhydride, phthalic anhydride and tetrahydrophthalic anhydride. In some embodiments, the acid is adipic acid. Blends of two or more acids may be used.

The polyester polyol intermediates of the present invention are prepared by reacting one or more of the dialkylene glycol described above with one or more of the dicarboxylic acids described above, and/or one or more of the esters or anhydrides thereof. In some embodiments, more than one equivalent of glycol is used for each equivalent of acid. The preparation includes (1) an esterification reaction of one or more dialkylene glycols with one or more dicarboxylic acids or anhydrides or (2) by transesterification reaction, i.e., the reaction of one or more dialkylene glycols with esters of dicarboxylic acids. Mole ratios generally in excess of more than one mole of glycol to acid are preferred so as to obtain linear chains having a preponderance of terminal hydroxyl groups.

In some embodiments, the polyester polyol intermediate of the present invention is used in combination with one or more polyether polyol intermediates and/or polyester polyol intermediates (that is one or more polyester polyol intermediates derived from polyols other than those described above). As used herein, the polyester polyol intermediates of the present invention may include a mixture of polyester and polyether linkages, but may not contain only polyether linkages or, in some embodiments, more than 70% polyether linkages. In other embodiments, the compositions of the present invention are substantially free, or free of, polyether polyol intermediates, and such materials are not used in the preparation, where polyether polyol intermediates as used herein can mean intermediates containing only polyether linkages, or containing less than 50, 40, 20, or even 15 percent polyester linkages.

The Diisocyanate.

The second reactant to make the ESD-TPU of this invention is a diisocyanate. Suitable diisocyanates include: (i) aromatic diisocyanates such as: 4,4'-methylenebis-(phenyl isocyanate) (MDI), m-xylylene diisocyanate (XDI), phenylene-1,4-diisocyanate, 1,5-naphthalene diisocyanate, diphenylmethane-3,3'-dimethoxy-4,4'-diisocyanate (TODI), and toluene diisocyanate (TDI); as well as (ii) aliphatic diisocyanates such as: isophorone diisocyanate (IPDI), 1,4-cyclohexyl diisocyanate (CHDI), decane-1,10-diisocyanate, hexamethylene diisocyanate (HDI), and dicyclohexylmethane-4,4'-diisocyanate. In some embodiments, the diisocyanate is 4,4'-methylenebis(phenyl isocyanate) (MDI). In other embodiments, one or more of the diisocyanates listed may be excluded from the present invention.

A mixture of two or more diisocyanates can be used. Also, small amounts of isocyanates having a functionality greater than 2, such as tri-isocyanates can be used together with the diisocyanates. Large amounts of isocyanates with a functionality of 3 or more should be avoided as they will cause the TPU polymer to be cross linked.

The Chain Extender.

Suitable chain extenders include glycols and can be aliphatic, aromatic or combinations thereof. In some embodiments, the chain extenders are glycols having from 2 to about 12 carbon atoms.

In some embodiments, the glycol chain extenders are lower aliphatic or short chain glycols having from about 2 to about 10 carbon atoms and include, for instance: ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, neopentyglycol, and the like. In some embodiments, the chain extender includes 1,4-butanediol.

Aromatic glycols may also be used as the chain extender to make the TPU including benzene glycol and xylene glycol. Xylene glycol is a mixture of 1,4-di(hydroxymethyl)benzene and 1,2-di(hydroxymethyl)benzene. Benzene glycol specifically includes hydroquinone, bis(beta-hydroxyethyl)ether also known as 1,4-di(2-hydroxyethoxy)benzene; resorcinol, bis(beta-hydroxyethyl)ether also known as 1,3-di(2-hydroxyethyl)benzene; catechol, bis(beta-hydroxyethyl)ether also known as 1,2-di(2-hydroxyethoxy)benzene; and combinations thereof.

A mixture of two or more glycols may be used as the chain extender in ESD-TPU of this invention. In some embodiments, the chain extender is a mixture of 1,4-butanediol and 1,6-hexanediol. In other embodiments, one or more of the chain extenders listed may be excluded from the present invention.

Diamines may also be used as a chain extender, as is well known in the art. In one embodiment of the present invention, the chain extender contains a diamine as a co-chain extender in combination with one or more of the chain extenders described above. In other embodiments the present invention does not use any diamines in the preparation of its compositions.

The Process of Making the TPU.

The three reactants (the polyester polyol intermediate, the diisocyanate, and the chain extender) are reacted together to form the high molecular weight ESD-TPU of this invention. Any known processes to react the three reactants may be used to make the TPU. In one embodiment, the process is a so-called "one-shot" process where all three reactants are added to an extruder reactor and reacted. The equivalent weight amount of the diisocyanate to the total equivalent weight amount of the hydroxyl containing components, that is, the polyester polyol intermediate and the chain extender glycol, can be from about 0.95 to about 1.10, or from about 0.96 to about 1.02, and even from about 0.97 to about 1.005. Reaction temperatures utilizing a urethane catalyst can be from about 175 degrees C. to about 245 degrees C., and in other embodiment from 180 degrees C. to 220 degrees C.

Generally, any conventional catalyst can be utilized to react the diisocyanate with the polyester polyol intermediates or the chain extender. Examples of suitable catalysts include the various alkyl amines, alkyl ethers or alkyl thiol ethers of bismuth or tin wherein the alkyl portion has from 1 to about 20 carbon atoms with specific examples including bismuth octoate, bismuth laurate, and the like. Preferred catalysts include the various tin catalysts such as stannous octoate, dibutyltin dioctoate, dibutyltin dilaurate, and the like. The amount of such catalyst is generally small, such as from about 20 to about 200 parts per million based upon the total weight of the polyurethane forming reactants.

The ESD-TPU can also be prepared utilizing a pre-polymer process. In the pre-polymer route, the polyester polyol intermediates are reacted with generally an equivalent excess of one or more diisocyanates to form a pre-polymer solution having free or unreacted diisocyanate therein. The reaction is generally carried out at temperatures of from about 80 degrees C. to about 220 degrees C., or from about 150 degrees C. to about 200 degrees C. in the presence of a suitable urethane catalyst. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the hydroxyl terminated polyesters and the chain extender is thus from about 0.95 to about 1.10, or from about 0.96 to about 1.02 and even from about 0.97 to about 1.05. The chain extension reaction temperature is generally from about 180 degrees C. to about 250 degrees C., or from about 200 degrees C. to about 240 degrees C. Typically, the pre-polymer route can be carried out in any conventional device including an extruder. In such embodiments, the polyester polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

In one embodiment, the ingredients are mixed in a single or twin screw extruder with multiple heat zones and multiple feed ports between its feed end and its die end. The ingredients may be added at one or more of the feed ports and the resulting ESD-TPU composition that exits the die end of the extruder may be pelletized.

In some embodiments, component (a), the polyester polyol intermediate includes poly(diethylene glycol adipate), component (b), the diisocyanate includes 4,4'-methylenebis-(phenyl isocyanate), and component (c), the chain extender includes butanediol, HQEE (hydroquinone bis(2-hydroxyethyl)ether), or combinations thereof.

The Metal Containing Salt.

In some embodiments, the compositions of the present invention may further comprise a metal-containing salt, salt complex, or salt compound formed by the union of metal ion with a non-metallic ion or molecule. The amount of salt present may be an amount effective to provide improved ESD properties to the ESD-TPU polymer and/or the overall composition. The optional salt component may be added during the one-shot polymerization process. The salt may be a lithium containing salt.

While the exact mechanism of attachment and/or attraction of the salt to the ESD-TPU polymer reaction product is not completely understood, the salt can unexpectedly improve the surface and volume resistivities of the resulting polymer, and may accomplish this without the presence of unacceptably high levels of extractable anions. Moreover, the static decay times remain in an acceptable range, that is, the times are not too fast or too slow.

Examples of salts useful in the present invention include: $LiClO_4$, $LiN(CF_3SO_2)_2$, $LiPF_6$, $LiAsF_6$, LiI, LiCl, LiBr, LiSCN, $LiSO_3CF_3$, $LiNO_3$, $LiC(SO_2CF_3)_3$, $Li_2S$, and $LiMR_4$, where M is Al or B, and R is a halogen, hydrocarbyl, alkyl or aryl group. In one embodiment, the salt is Li $N(CF_3SO_2)_2$, which is commonly referred to as lithium trifluoromethane sulfonimide (but which is also sometimes referred to as lithium trifluoromethane sulfonamide even though it has a imide structure), or the lithium salt of trifluoromethane sulfonic acid. The effective amount of the selected salt added to the one-shot polymerization may be at least about 0.10, 0.25, or even 0.75 parts by weight based on 100 parts by weight of the polymer.

In some embodiments, the compositions of the present invention further comprises a sulfonate-type anionic antistatic agent. Suitable examples include metal alkylsulfonates and metal alkyl-aromatic sulfonates. The metal alkylsulfonates can include, alkali metal or alkaline earth metal aliphatic sulfonates in which the alkyl group has 1 to 35 or 8 to 22 carbon atoms. The alkali metals may include sodium and potassium and the alkaline earth metals may include calcium, barium and magnesium. Specific examples of metal alkylsulfonates include sodium n-hexylsulfonate, sodium n-heptylsulfonate, sodium n-octylsulfonate, sodium n-nonylsulfonate, sodium n-decylsulfonate, sodium n-dodecylsulfonate, sodium n-tetradecylsulfonate, sodium n-hexadecylsulfonate, sodium n-heptadecylsulfonate and sodium n-octadecylsulfoante. Specific examples of metal alkyl-aromatic sulfonates include alkali metal or alkaline earth metal salts of sulfonic acids comprising 1 to 3 aromatic nuclei substituted with an alkyl group having 1 to 35 or 8 to 22, carbon atoms. The aromatic sulfonic acids include, for example, benzenesulfonic, naphthalene-1-sulfonic, naphthalene-2,6-disulfonic, diphenyl-4-sulfonic and diphenyl ether 4-sulfonic acids. Metal alkyl-aromatic sulfonates include, for example, sodium hexylbenzenesulfonate, sodium nonylbenzenesulfonate and sodium dodecylbenzenesulfonate.

The compositions of the present invention may also include an non-metal containing anti-stat additives, such as ionic liquids. Suitable liquids include tri-n-butylmethylammonium bis-(trifluoroethanesulfonyl)imide (available as FC-4400 from 3M™), and similar materials.

In some embodiments, the present invention allows for the use of co-solvent with the metal containing salt. The use of a co-solvent may, in some embodiments, allow a lower charge of salt to provide the same benefit in ESD properties. Suitable co-solvents include ethylene carbonate, propylene carbonate, dimethyl sulfoxide, tetramethylene sulfone, tri- and tetra ethylene glycol dimethyl ether, gamma butyrolactone, and N-methyl-2-pyrrolidone. When present, the co-solvent may be used at least about 0.10, 0.50 or even 1.0 parts by weight based on 100 parts by weight of the polymer. In some embodiments, the compositions of the present invention are substantially free to free of any or all of the co-solvents described herein.

In other embodiments, the compositions of the present invention are substantially free to free of any or all of the metal containing salts described herein.

Additional Additives.

The compositions of the present invention may further include additional useful additives, where such additives can be utilized in suitable amounts. These optional additional additives include opacifying pigments, colorants, mineral and/or inert fillers, stabilizers including light stabilizers, lubricants, UV absorbers, processing aids, antioxidants, antiozonates, and other additives as desired. Useful opacifying pigments include titanium dioxide, zinc oxide, and titanate yellow. Useful tinting pigments include carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wallostonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils and amide waxes. Useful UV absorbers include 2-(2'-hydroxyphenyl) benzotriazoles and 2-hydroxybenzophenones. Additives can also be used to improve the hydrolytic stability of the TPU polymer. Each of these optional additional additives described above may be present in, or excluded from, the compositions of the present invention.

When present, these additional additives may be present in the compositions of the present invention from 0 or 0.01 to 5 or 2 weight percent of the composition. These ranges may apply separately to each additional additive present in the composition or to the total of all additional additives present.

Polymer Containing Blends.

The ESD-TPU polymers of the present invention may be blended with a matrix or base polymer to form a polymer blend. These blends may also be made with the salt-modified ESD-TPU polymers described above.

Suitable base polymers as defined herein can be a homopolymer or a copolymer. The base polymer may be a blend of multiple base polymers, and may further include any of the additional additives described above, including ESD additives. In some embodiments, the base polymer and/or the compositions of the present invention are substantially free to free of ESD additives.

The base polymer may include:

(i) a polyolefin (PO), such as polyethylene (PE), polypropylene (PP), polybutene, ethylene propylene rubber (EPR), polyoxyethylene (POE), cyclic olefin copolymer (COC), or combinations thereof;

(ii) a styrenic, such as polystyrene (PS), acrylonitrile butadiene styrene (ABS), styrene acrylonitrile (SAN), styrene butadiene rubber (SBR or HIPS), polyalphamethylstyrene, methyl methacrylate styrene (MS), styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof;

(iii) a thermoplastic polyurethane (TPU);

(iv) a polyamide, such as Nylon™, including polyamide 6,6 (PA66), polyamide 1,1 (PA11), polyamide 1,2 (PA12), a copolyamide (COPA), or combinations thereof;

(v) an acrylic polymer, such as polymethyl acrylate, polymethylmethacrylate, or combinations thereof;

(vi) a polyvinylchloride (PVC), a chlorinated polyvinylchloride (CPVC), or combinations thereof;

(vii) a polyoxymethylene, such as polyacetal;

(viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG) polylatic acid (PLA), or combinations thereof;

(ix) a polycarbonate (PC), a polyphenylene sulfide (PPS), a polyphenylene oxide (PPO), or combinations thereof;

or combinations thereof.

Polyvinyl chloride (PVC), vinyl polymer, or vinyl polymer material, as used herein, refers to homopolymers and copolymers of vinyl halides and vinylidene halides and includes post halogenated vinyl halides such as CPVC. Examples of these vinyl halides and vinylidene halides are vinyl chloride, vinyl bromide, vinylidene chloride and the like. The vinyl halides and vinylidene halides may be copolymerized with each other or each with one or more polymerizable olefinic monomers having at least one terminal $CH_2$=C<grouping. As examples of such olefinic monomers there may be mentioned the alpha, beta-olefinically unsaturated carboxylic acids, such as acrylic acid, methacrylic acid, ethyl acrylic acid, alpha-cyano acrylic acid, and the like; esters of acrylic acid, such as methyl acrylate, ethyl acrylate, butyl acrylate, octyl acrylate, cyanoethyl acrylate, hydroxyethyl acrylate, and the like; esters of methacrylic acid, such as methyl methacrylate, butyl methacrylate, hydroxyethyl methacrylate, and the like; nitriles, such as acrylonitrile, methacrylonitrile, and the like; acrylamides, such as methyl acrylamide, N-methylol acrylamide, N-butyoxy methylacrylamide, and the like; vinyl ethers, such as ethyl vinyl ether, chloroethyl vinyl ether, and the like; the vinyl ketones; styrene and styrene derivatives, such as .alpha.-methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art. In one embodiment, the base polymer includes polyvinyl chloride (PVC) and/or polyethylene terephthalate (PET).

Industrial Application

The compositions of the present invention, including the blends described above, are useful for a variety of applications. Some examples are tubes, paper trays, floor tiles, machine housings, construction and manufacturing equipment, and polymeric sheets and films. More specifically, examples include fuel handling equipment such as fuel lines and vapor return equipment, business equipment, coatings for floors such as for clean rooms and construction areas, applications, clean room equipment including garments, floorings, mats, electronic packaging, and housings, chip holders, chip rails, tote bins and tote bin tops, medical applications, battery parts such as dividers and/or separators, and generally shaped articles.

In one embodiment, the compositions of the present invention are used to make polymeric articles to be used as: packaging materials for electronic parts; internal battery separators for use in the construction of lithium-ion batteries; clean room supplies and construction materials; antistatic conveyor belts; parts for office machines; antistatic garments and shoes, or combinations thereof.

Electronic parts include ESD sensitive parts including semiconductors. The articles of the present invention may also be durable or consumable parts for clean room equipment and applications. Also included are construction and/or building materials for clean rooms and data centers, which may include items such as softwalls, curtains, flooring, benches, etc. The articles of the present invention also include laminated sheets, conveyor belts for manufacturing of food, pharmaceutical products, medical devices, and electronic components; or combinations thereof.

Furthermore, the compositions of the present invention may be used to prepare separators and other components of lithium-ion batteries, lithium-polymer batteries and fuel cells. Such uses of the compositions and articles of the present invention offer advantages over current batteries and fuel cells in the areas of improved safety, performance, cost, or combinations thereof. The compositions of the present invention may be used to construct separator layers that are placed between the anodes of the battery, as well as polymer electrolyte membranes.

The compositions can be used with various molding techniques including injection molding, compression molding, slush molding, extrusion, thermoforming cast, rotational molding, sintering, and vacuum molding. Articles of this invention may also be made from resins produced by the suspension, mass, emulsion or solution processes.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

Example 1-A

An ESD TPU is prepared by reacting 4,4'-methylenebis-(phenyl isocyanate), benzene glycol, and a polyester polyol intermediate derived from diethylene glycol and adipic acid, in the manner described above, using the one shot process in the presence of a tin catalyst.

Example 1-B

An ESD TPU is prepared according to the procedure in Example 1-A except that the TPU is doped, via wet absorption, with 1.9 parts per hundred (phr) of lithium trifluoromethane sulfonimide, a metal containing salt.

Example 1-C

An ESD TPU is prepared according to the procedure in Example 1-A except that the TPU is doped, via wet absorption, with 1.4 phr of the lithium salt of trifluoromethane sulfonic acid, a metal containing salt.

Example 1-D

An ESD TPU is prepared according to the procedure in Example 1-A except that the TPU is doped, via wet absorption, with 1.3 phr of the lithium salt of trifluoromethane sulfonic acid, a metal containing salt.

Example 2-A

An ESD TPU is prepared by reacting 4,4'-methylenebis-(phenyl isocyanate), 1,4-butandiol, and a polyester polyol intermediate derived from diethylene glycol and adipic acid, in the manner described above, using the one shot process in the presence of a tin catalyst.

Example 2-B

An ESD TPU is prepared according to the procedure in Example 2-A except that the TPU is doped, via wet absorption, with 1.9 phr of lithium trifluoromethane sulfonimide, a metal containing salt.

Example 2-C

An ESD TPU is prepared according to the procedure in Example 2-A except that the TPU is doped, via wet absorption, with 1.4 phr of the lithium salt of trifluoromethane sulfonic acid, a metal containing salt.

Comparative Example 3-A

A commercially available ESD polyether TPU is used for comparison to the compositions of the present invention. This example is Stat-Rite™ C-2300, an ESD polyether TPU available from the Lubrizol Advanced Materials, Inc.

The examples described above were tested to evaluate the ESD and physical properties. The results of this testing is shown in the tables below.

TABLE 1

Properties of Non-Doped TPUs

| Property | Test[1] | Ex 1-A | Ex 2-A | Comp Ex 3-A |
|---|---|---|---|---|
| Hardness (5 sec), Shore A | D2240 | 70 | 85 | 70 |
| Specific Gravity | D792 | 1.23 | 1.24 | 1.20 |
| Melting Point (Tm), degrees C. | Internal | 140 | 166 | 130 |
| Glass Trans Pt (Tg), degrees C. | | −24 | −22 | −28 |
| Tensile Strength, MPa | D412 | 17.9 | 48.3 | 19.3 |
| Ultimate Elongation, % | | 830 | 610 | 800 |
| Tensile Stress at 100%, MPa | | 3.4 | 6.6 | |
| Tensile Stress at 300%, MPa | | 5.5 | 11.0 | |
| Graves Tear Strength, kg/mm | D624 (die C) | 5.6 | 9.1 | 4.7 |
| Taber Loss (per 1000 rev), mg | D3389 (H18, 1 kg) | 6 | 35 | 140 |
| Surface Resistivity, Ohm/sq | D-257 | 2.6E+11 | 2.0E+12 | 3.9E+09 |
| Volume Resistivity, Ohm-cm | (50% RH) | 1.0E+11 | 9.0E+11 | 7.1E+09 |

[1]All test methods are ASTM methods, except for the DSC testing which was completed internally using a differential scanning calorimeter (DSC). Resistance results are formatted such that 1.0E+10 indicates a result of $1.0 \times 10^{10}$ and so on.

TABLE 2

ESD Properties of Non-Doped and Doped TPUs

| Material | Surface Resistivity[1] (Ohm/sq) | Volume Resistivity[1] (Ohm-cm) |
|---|---|---|
| Example 1-A | 2.6E+11 | 1.0E+11 |
| Example 1-B | 1.2E+08 | 1.1E+07 |
| Example 1-C | 1.2E+08 | 3.8E+07 |
| Example 1-D | 3.2E+08 | 7.8E+07 |
| Example 2-A | 2.0E+12 | 9.0E+11 |
| Example 2-B | 4.3E+09 | 1.4E+08 |
| Example 2-C | 1.1E+09 | 2.4E+08 |
| Comp Ex 3-A | 3.9E+09 | 7.1E+09 |

[1]ESD properties are measured by ASTM D-257, at 50% relative humidity (RH). Resistance results are formatted such that 1.0E+10 indicates a result of $1.0 \times 10^{10}$ and so on.

The results show that the ESD TPU polymers of the present invention have physical properties significantly better than the comparative ESD polyether TPU. In addition, the non-doped ESD TPU compositions of the present invention have good ESD properties, comparable, if not equivalent to the ESD properties of the comparative ESD polyether TPU while the metal salt doped ESD TPU compositions of the present invention provide better ESD properties than the comparative ESD polyether TPU.

Example 1-D was tested to evaluate additional ESD properties. A summary of these results is presented in the table below.

TABLE 3

ESD Properties of Example 1-D

| Property | Test | Example 1-D |
|---|---|---|
| Surface Resistivity, Ohm/sq | D-257 | 3.9E+09 |
| Volume Resistivity, Ohm-cm | (50% RH) | 7.1E+09 |
| Surface Resistance, Ohms | ESD S11.11 (12% RH) | 3.3E+08 |
| Static Decay Time[1] +5000 V to +50 V −5000 V to −50 V +1000 V to +100 V | FTMS-101C (12% RH) | <0.1 sec |

[1]Static decay rate measures the time it takes for an article made of the example material to discharge the indicated starting voltage and reach the indicated ending voltage. The result is measured in accordance with the FTMS-101C regulation.

Additional ESD TPU examples are also prepared, by in situ polymerization, as described below.

Example 4-A

An ESD TPU is prepared by in situ polymerization, combining 92.4 pbw of a polyester polyol intermediate prepared from 1,4-butandiol and adipic acid, 92.4 pbw a polyester polyol intermediate prepared from diethylene glycol and adipic acid, 14.2 pbw benzene glycol, 43.4 pbw 4,4'-methylenebis-(phenyl isocyanate), 24.3 pbw lithium trifluoromethane sulfonimide, and 1 drop of tin octoate.

Example 4-B

An ESD TPU is prepared according to the procedure in Example 4-A except that 73.0 pbw of an ionic liquid that contains bis(perfluoromethane)sulfonimide, alkyl ammonium salt is added to the material during processing.

Example 5-A

An ESD TPU is prepared by in situ polymerization, combining 92.4 pbw of a polyester polyol intermediate prepared from 1,4-butandiol and adipic acid, 92.4 pbw a polyester polyol intermediate prepared diethylene glycol and adipic acid, 14.2 pbw benzene glycol, 43.4 pbw 4,4'-methylenebis-(phenyl isocyanate), and 0.75 pbw di-propylene glycol.

Example 5-B

An ESD TPU is prepared according to the procedure in Example 5-A except that 2.0 pbw of lithium trifluoromethane sulfonimide is added to the material during processing. The salt is added during the one shot polymerization of the TPU, as described above.

Example 5-C

An ESD TPU is prepared according to the procedure in Example 5-B except that 3.0 pbw of lithium trifluoromethane sulfonimide is added to the material during processing.

Example 5-D

An ESD TPU is prepared according to the procedure in Example 5-B except that 3.5 pbw of lithium trifluoromethane sulfonimide is added to the material during processing.

The examples described above were tested to evaluate their ESD properties. The results of this testing is provided in the table below.

TABLE 4

ESD Properties of Non-Doped and Doped TPUs

| Material | Surface Resistivity[1] (Ohm/sq) | Volume Resistivity[1] (Ohm-cm) |
| --- | --- | --- |
| Comp Ex 3-A | 3.9E+09 | 7.1E+09 |
| Example 4-A | 1.4E+07 | 3.4E+06 |
| Example 4-B | 1.7E+06 | 1.3E+06 |
| Example 5-A | 1.2E+11 | |
| Example 5-B | 6.8E+08 | |
| Example 5-C | 2.1E+08 | |
| Example 5-D | 6.5E+08 | |

[1]ESD properties are measured by ASTM D-257, at 50% relative humidity (RH).

The results show that the ESD TPU polymers of the present invention have ESD properties comparable to the comparative ESD polyether TPU. The results also show that when the ESD TPU polymers of the present invention further include a metal containing salt, the ESD properties of the compositions are improved to the point that they are better than the comparative ESD polyether TPU.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

We claim:

1. An electrostatic dissipative thermoplastic polyurethane composition made by reacting (a) at least one polyester polyol intermediate comprising poly(diethylene glycol adipate) with (b) at least one diisocyanate comprising 4,4'-methylenebis-(phenyl isocyanate) and (c) at least one glycol chain extender comprising hydroquinone di(hydroxyethyl) ether;
   wherein said electrostatic dissipative thermoplastic polyurethane composition further comprises an effective amount of a metal salt for electrostatic dissipation wherein said metal salt is substantially free of any co-solvents and wherein the metal salt is not added to the electrostatic dissipative thermoplastic polyurethane composition in combination with a co-solvent;
   wherein said metal salt comprises lithium trifluoromethane sulfonamide; and
   wherein said electrostatic dissipative thermoplastic polyurethane composition further comprises an antistatic agent comprising tri-n-butylmethylammonium bis-(trifluororethanesulfonyl)imide.

2. The composition of claim 1 wherein (b), the diisocyanate, further comprises: hexamethylene diisocyanate, 3,3'-dimethylbiphenyl-4,4'-diisocyanate, m-xylylene diisocyanate, phenylene-1,4-diisocyanate, naphthalene-1,5-diisocyanate, diphenylmethane-3,3'-dimethoxy-4,4'-diisocyanate, toluene diisocyanate, isophorone diisocyanate, 1,4-cyclohexyl diisocyanate, decane-1,10-diisocyanate, dicyclohexylmethane-4,4'-diisocyanate, or combinations thereof; and
   wherein (c), the chain extender, further comprises: ethylene glycol, diethylene glycol, propylene glycol, dipropylene glycol, 1,6-hexanediol, 1,3-butanediol, 1,5-pentanediol, 1,4-cyclohexane-dimethanol, neopentyglycol, 1,4-bis(2-hydroxyethoxy) benzene, 1,4-butanediol, or combinations thereof.

3. The composition of claim 1 wherein said composition has at least one of the following characteristics:

(i) the composition has a surface resistivity below $1.0 \times 10^{13}$ ohm/square and a volume resistivity below $1.0 \times 10^{12}$ ohm-centimeter, as measured by ASTM D-257;

(ii) the composition has a static decay rate of less than about 0.1 seconds from 1000 V to 100 V as measured at 50% relative humidity using a charged plate monitor; and in which said composition has a static decay rate of less than about 0.1 seconds from 5000 V to 50 V or from −5000 V to −50 V as measured at 12% relative humidity by FTMS 101C.

4. The composition of claim 1 wherein said composition has at least one of the following characteristics:

(i) the composition has a hardness of at least 60 Shore A units, as measured by ASTM D-2240;

(ii) the composition has a tensile strength of at least 10 MPa and an ultimate elongation of more than 300% as measured by ASTM D-412;

(iii) the composition has Graves tear value of at least 5 kg/mm, as measured by ASTM D-624, using die C;

(iv) the composition has a taber loss, per 1000 revolutions, of less than 100 mg, as measured by ASTM D-3389;

(v) the composition has a weight average molecular weight of at least 60,000;

(vi) the composition has a melt flow index of less than 50, as measured by ASTM D-1238 Procedure A at a barrel temperature of 190° C. and a 3.8 kg piston load.

5. The composition of claim 1 wherein (a), the polyester polyol component, is substantially free of polyether polyols.

6. The composition of claim 1 further comprising at least one base polymer.

7. The composition of claim 6 wherein the base polymer comprises: a polyolefin; a styrenic; a thermoplastic polyurethane, a polyamide; an acrylic polymer; a polyvinylchloride, a chlorinated polyvinylchloride; a polyoxymethylene; a polyester; a polycarbonate; a polyphenylene oxide; polyphenylene sulfide; or combinations thereof.

8. A process of making an electrostatic dissipative thermoplastic polyurethane composition, comprising the steps of:

(i) reacting (a) at least one polyester polyol intermediate comprising poly(diethylene glycol adipate) with (b) at least one diisocyanate comprising 4,4'-methylenebis(phenyl isocyanate) and (c) at least one chain extender comprising hydroquinone di(hydroxyethyl) ether;

(ii) adding to said electrostatic dissipative thermoplastic polyurethane an effective amount of a metal salt for electrostatic dissipation wherein said metal salt is substantially free of any co-solvents and wherein the metal salt is not added to the electrostatic dissipative thermoplastic polyurethane composition in combination with a co-solvent;

wherein the addition of the metal salt in step (ii) takes place after the reaction forming the thermoplastic polyurethane in step (i);

wherein said metal salt comprises lithium trifluoromethane sulfonamide; and wherein said electrostatic dissipative thermoplastic polyurethane composition further comprises an antistatic agent comprising tri-n-butylmethylammonium bis-(trifluoroethanesulfonyl)imide.

9. A shaped polymeric article comprising the electrostatic dissipative thermoplastic polyurethane composition of claim 1.

10. The polymeric article of claim 9, wherein the article comprises:

packaging materials for ESD sensitive semiconductor and electronic parts; durable or consumable parts for clean room equipment and applications; construction materials for clean rooms and datacenters; fibers; laminated sheets; conveyor belts; pharmaceutical products; medical devices; electronic components; separators for use in the construction of lithium-ion batteries; polymer electrolyte membranes for use in the construction of lithium-polymer batteries and fuel cells; or combinations thereof.

11. A battery part comprising the electrostatic dissipative thermoplastic polyurethane composition of claim 1.

12. An internal battery separator comprising the electrostatic dissipative thermoplastic polyurethane composition of claim 1.

\* \* \* \* \*